US012756231B2

(12) United States Patent
Kim et al.

(10) Patent No.: US 12,756,231 B2
(45) Date of Patent: Oct. 6, 2026

(54) WIRELESS CHARGING RECEIVER AND WIRELESS CHARGING SYSTEM WITH REDUCED AUDIBLE NOISE

(71) Applicant: Samsung Electronics Co., Ltd., Suwon-si (KR)

(72) Inventors: Hyun Su Kim, Suwon-si (KR); Sung Woo Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 948 days.

(21) Appl. No.: 18/149,474

(22) Filed: Jan. 3, 2023

(65) Prior Publication Data

US 2023/0291240 A1 Sep. 14, 2023

(30) Foreign Application Priority Data

Mar. 11, 2022 (KR) ........................ 10-2022-0030746
Jul. 7, 2022 (KR) ........................ 10-2022-0083863

(51) Int. Cl.
*H01M 10/46* (2006.01)
*H02J 50/10* (2016.01)
(Continued)

(52) U.S. Cl.
CPC ........... *H02J 50/10* (2016.02); *H02M 3/1588* (2013.01); *H02M 7/4835* (2021.05); *H02J 2207/20* (2020.01)

(58) Field of Classification Search
CPC .......... H02J 50/10; H02J 50/005; H02J 50/80; H02J 2207/20; H02M 7/4835; H02M 3/1588
(Continued)

(56) References Cited

U.S. PATENT DOCUMENTS 8,655,272 B2 * 2/2014 Saunamaki ............. H02J 50/10 455/298
10,637,301 B2 * 4/2020 Garbus ................... H02J 50/10
(Continued)

FOREIGN PATENT DOCUMENTS

KR 10-2007-0044302 A 4/2007
KR 2021-0113366 A 9/2021
(Continued)

OTHER PUBLICATIONS

European Office Action dated Jul. 26, 2023 for corresponding European Application No. 23160828.2.
(Continued)

*Primary Examiner* — Edward Tso
(74) *Attorney, Agent, or Firm* — Fish & Richardson P.C.

(57) ABSTRACT

A wireless charging system including a wireless charging receiver is provided. The wireless charging receiver may be configured to wirelessly receive electrical power from a wireless charging transmitter. The wireless charging receiver may include an inductor inductively coupled to the wireless charging transmitter, a rectifier connected to the inductor and configured to rectify a signal received from the inductor, a DC-DC converter configured to convert a DC signal received from the rectifier, a switching block configured to receive a common voltage generated from the DC-DC converter and including a first switch, and a first capacitor configured to receive the common voltage from the switching block and connected to the inductor at a first node, wherein the common voltage is not zero.

20 Claims, 6 Drawing Sheets

(51) Int. Cl.
*H02M 3/158* (2006.01)
*H02M 7/483* (2007.01)

(58) Field of Classification Search
USPC ........ 320/107, 108, 133, 134, 140, 155, 162
See application file for complete search history.

(56) References Cited

U.S. PATENT DOCUMENTS

| | | | | |
|---|---|---|---|---|
| 10,998,776 | B2 * | 5/2021 | Chen | H02J 7/02 |
| 2013/0147279 | A1 * | 6/2013 | Muratov | H02J 7/00036 307/104 |
| 2015/0098162 | A1 | 4/2015 | Kohout | |
| 2019/0326782 | A1 * | 10/2019 | Graham | H02J 50/12 |
| 2020/0220392 | A1 * | 7/2020 | Pan | A61B 5/0031 |
| 2021/0184502 | A1 * | 6/2021 | Ren | H02J 50/10 |
| 2023/0283115 | A1 * | 9/2023 | Wadkar | H02J 50/10 307/104 |

FOREIGN PATENT DOCUMENTS

| | | | | |
|---|---|---|---|---|
| KR | 20230038572 | A * | 3/2023 | H02J 1/106 |
| WO | WO-2013/090572 | A1 | 6/2013 | |

OTHER PUBLICATIONS

European Search Report dated Jul. 13, 2023 for corresponding European Application No. 23160828.2.

* cited by examiner

WIRELESS CHARGING RECEIVER AND WIRELESS CHARGING SYSTEM WITH REDUCED AUDIBLE NOISE

CROSS-REFERENCE TO RELATED APPLICATIONS

This application claims priority from Korean Patent Application No. 10-2022-0030746 filed on Mar. 11, 2022 in the Korean Intellectual Property Office and from Korean Patent Application No. 10-2022-0083863 filed on Jul. 7, 2022 in the Korean Intellectual Property Office and all the benefits accruing therefrom under 35 U.S.C. 119, the contents of each of which in its entirety are herein incorporated by reference.

BACKGROUND

Technical Field

The present inventive concepts relate to wireless charging receivers and a wireless charging systems comprising the same.

Description of the Related Art

Wireless Power Transfer (WPT) also referred to as a wireless charging technology may replace the existing wired power transmission technology. A wireless charging transmitter for wireless charging may supply a power (e.g., electrical power) to a wireless charging receiver for wireless charging without relying on a charging cable. For example, when a mobile phone is charged, wireless charging may be performed directly without connecting the mobile phone to the charging cable. There are several implementations in the wireless charging technology. At present, electromagnetic induction wireless charging technologies are widely used in the field of home appliances. Based on the electromagnetic induction wireless charging technologies, a wireless power consortium defines an international wireless charging standard Qi (simply, Qi standard) compatible with all chargeable electronic devices.

Most of the wireless charging transmitters for wireless charging in the current market are single coil wireless charging transmitters based on the Qi standard. Interaction between the wireless charging transmitter and a wireless charging receiver includes three steps of selection, ping, and power transmission. In the ping step, the wireless charging transmitter emits ping pulse energy in an attempt to check whether an object includes a wireless charging receiver. After the ping pulse energy received by the wireless charging receiver reaches a threshold value of the wireless charging receiver, the wireless charging receiver establishes a power connection to the wireless charging transmitter so that the wireless charging transmitter checks that the object includes the wireless charging receiver. This is known as successful ping. After successful ping, the interaction proceeds to next step, i.e., the power transmission step. A space in which the wireless charging transmitter may successfully ping the wireless charging receiver may be referred to as a degree of freedom.

SUMMARY

Some example embodiments of the present inventive concepts provide a wireless charging transmitter and/or a wireless charging receiver with improved product reliability, via improving wireless charging performance and/or reliability thereof, based on the wireless charging transmitter and/or the wireless charging receiver being configured to remove, reduce, or minimize noise of an audible frequency band (e.g., referred to as acoustic noise, audible noise, or singing noise), which may otherwise occur in a communication process between the wireless charging transmitter and the wireless charging receiver, from a signal generated during the communication process between the wireless charging transmitter and the wireless charging receiver through amplitude modulation (e.g., amplitude shift keying (ASK)).

Some example embodiments of the present inventive concepts provide a wireless charging system including a wireless charging transmitter and/or a wireless charging receiver with improved product reliability, via improving wireless charging performance and/or reliability thereof, based on the wireless charging transmitter and/or the wireless charging receiver being configured to remove, reduce, or minimize noise of an audible frequency band from a signal generated during the communication process between the wireless charging transmitter and the wireless charging receiver through amplitude modulation (e.g., amplitude shift keying (ASK)).

The example embodiments of the present inventive concepts are not limited to those mentioned above and some example embodiments of the present inventive concepts, which are not mentioned herein, will be clearly understood by those skilled in the art from the following description of the present inventive concepts.

According to some example embodiments of the present inventive concepts, a wireless charging receiver may be configured to wirelessly receive electrical power (e.g., an electrical power) from a wireless charging transmitter. The wireless charging receiver may include an inductor configured to be inductively coupled to wireless charging transmitter, a rectifier connected to the inductor and configured to rectify a signal received from the inductor, a DC-DC converter configured to convert a DC signal received from the rectifier, a switching block configured to receive a common voltage generated from the DC-DC converter and including a first switch, and a first capacitor configured to receive the common voltage from the switching block and connected to the inductor at a first node n1, wherein the common voltage is not zero (0).

According to some example embodiments of the present inventive concepts, there is provided a wireless charging receiver that may be configured to wirelessly receive electrical power (e.g., an electrical power) from a wireless charging transmitter, modulate an amplitude of an AC signal received through a first capacitor based on the wirelessly received electrical power, and transmit the AC signal, of which amplitude is modulated, to the wireless charging transmitter, wherein the first capacitor is configured to receive the AC signal through a first node, receive a common voltage, which is not 0, through a second node that is different from the first node, and remove noise of an audible frequency band that is included in the AC signal of which amplitude is modulated.

According to some example embodiments of the present inventive concepts, there is provided a wireless charging system which may include a wireless charging transmitter configured to generate charging electrical power (e.g., a charging electrical power); and a wireless charging receiver configured to wirelessly receive the charging electrical power from the wireless charging transmitter. The wireless charging receiver may include, an inductor inductively coupled to the wireless charging transmitter, a rectifier connected to the inductor and configured to rectify a signal received from the inductor, a DC-DC converter configured to convert a DC signal received from the rectifier, a switching block configured to receive a common voltage generated from the DC-DC converter and including a first switch, and a first capacitor configured to receive the common voltage from the switching block and connected to the inductor at a first node n1, wherein the common voltage is not zero (0).

Details of some example embodiments are included in the detailed description and drawings.

BRIEF DESCRIPTION OF THE DRAWINGS

The above and other aspects and features of the present inventive concepts will become more apparent by describing in detail example embodiments thereof with reference to the attached drawings, in which.

DETAILED DESCRIPTION

Figure 1:
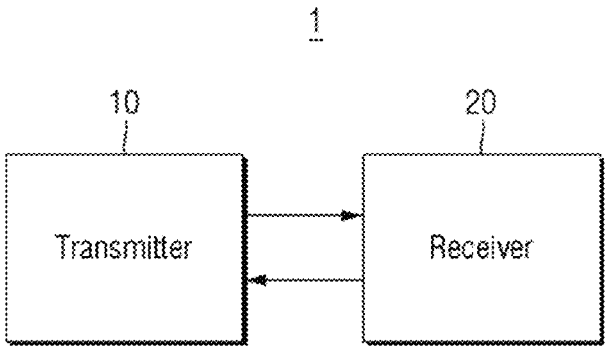
FIG. 1 is an example block diagram illustrating a wireless charging system according to some example embodiments.

Elements described with reference to terms such as units, modules and blocks, or terms such as receiver or transmitter (~or, ~er), which are used in the detailed description, and functional blocks shown in the drawings may be implemented in the form of software, or hardware, or their combination. Illustratively, the software may be machine code, firmware, embedded code, and application software. For example, the hardware may include an electrical circuit, an electronic circuit, a processor, a computer, an integrated circuit, integrated circuit cores, a pressure sensor, an inertia sensor, a microelectromechanical system (MEMS), a passive device, or their combination.

FIG. 1 is an example block diagram illustrating a wireless charging system according to some example embodiments.

Referring to FIG. 1, a wireless charging system 1 includes a wireless charging transmitter 10 and a wireless charging receiver 20. The wireless charging transmitter 10 may forward a power to the wireless charging receiver 20 to perform wireless charging for the wireless charging receiver 20.

The wireless charging receiver 20 may be an article (e.g., unit, instance, etc.) of mobile user equipment (UE), an access terminal, a subscriber unit, a subscriber station, a mobile station, a mobile, a remote station, a remote terminal, a user terminal, or a user agent. An access terminal may be a cellular telephone, a handheld device having a wireless communication function, a computing device, a device in a vehicle, a wearable device, a terminal of a 5G system, a future evolved public land mobile network (PLMN), or the like. In detail, the wireless charging receiver 20 may be a mobile phone, a tablet computer (pad), a computer having a wireless transceiving function, a virtual reality (VR) terminal device, an augmented reality (AR) terminal device, a wireless terminal for industrial control, a wireless terminal for self-driving, a wireless terminal for remote medical surgery, a wireless terminal for a smart grid, a wireless terminal for transportation safety, a wireless terminal for a smart city, a wireless terminal for a smart home, etc.

The wireless charging receiver 20 may be also a wireless charging electronic device, a smart phone, a tablet PC, an electronic book reader, a desktop PC, a laptop PC, a netbook computer, a workstation, a server, a personal digital assistant (PDA), a portable multimedia player (PMP), an MP3 player, a mobile medical device, a camera, or a wearable device (smart glasses, a head mounted device (HMD), an electronic garment, an electronic bracelet, an electronic necklace, an electronic application accessory (or an application accessory), an electronic tattoo, a smart mirror, or a smart watch).

The wireless charging receiver 20 may be also a smart home appliance. The smart home appliance may be, for example, a television (TV), a digital video disc (DVD) player, an audio player, a refrigerator, an air conditioner, a cleaner, an oven, an electronic range, a washing machine, an air purifier, a set-top box, a home automation control panel, a security control panel, a TV box (e.g., Samsung HomeSync™, Apple TV™ or Google TV™), game consoles (e.g., Xbox™ or PlayStatation™), an electronic dictionary, an electronic key, a camcorder, or a digital picture frame. The wireless charging receiver 20 may be also various medical devices (e.g., various portable medical devices such as blood glucose meter, heart rate meter, blood pressure gauge and thermometer), magnetic resonance angiography (MRA) equipment, magnetic resonance imaging (MRI) equipment, computer tomography (CT) equipment, medical camcorder or ultrasonic device, navigation device, global positioning system (GPS) wireless charging receiver, event data recorder (EDR), flight data recorder (FDR), a vehicle infotainment device, a marine electronic device (e.g., a navigation device for ship or gyro compass), an avionic electronic device, a security device, a vehicle head unit, an industrial or home robot, an automatic teller machine (ATM), a point of sale (POS) for a store, or an Internet of things (IoT) device (e.g., a bulb, various sensors, an electric or gas meter, a water sprayer, a fire alarm, a temperature controller, a street lamp, toaster, a fitness equipment, a hot water tank, a heater or a boiler). The wireless charging receiver 20 may be also a portion of furniture or building/structure, an electronic substrate, an electronic signature receiving device, a projector or various meters (e.g., a water meter, an electric meter, or a gas meter).

In some example embodiments, the wireless charging receiver 20 may be one or combination of the aforementioned devices. The wireless charging receiver according to some example embodiments may be a flexible electronic device. In addition, the wireless charging receiver according to some example embodiments of the present inventive concepts are not limited to the aforementioned device, and may be a new wireless charging receiver introduced in accordance with the development of the technologies.

Figure 2:
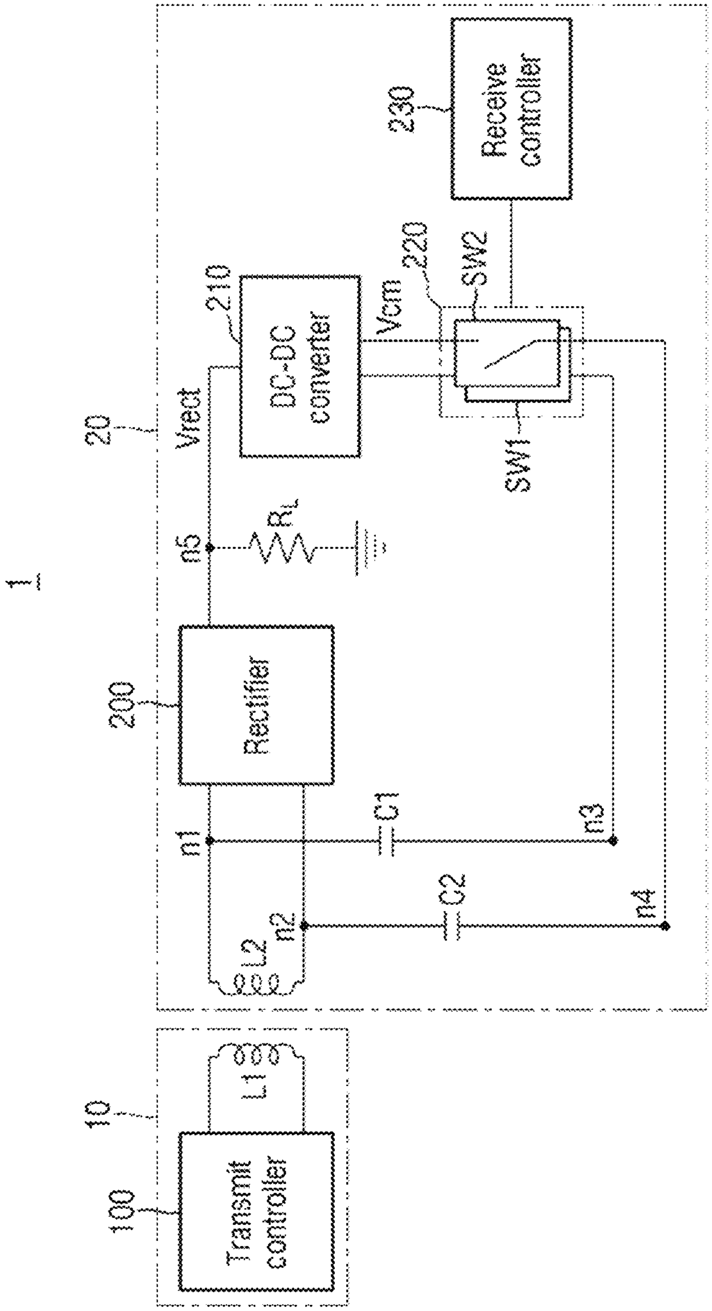
FIGS. 2 and 3 are example block diagrams specifically illustrating the inside of a wireless charging system according to some example embodiments.
Figure 3:
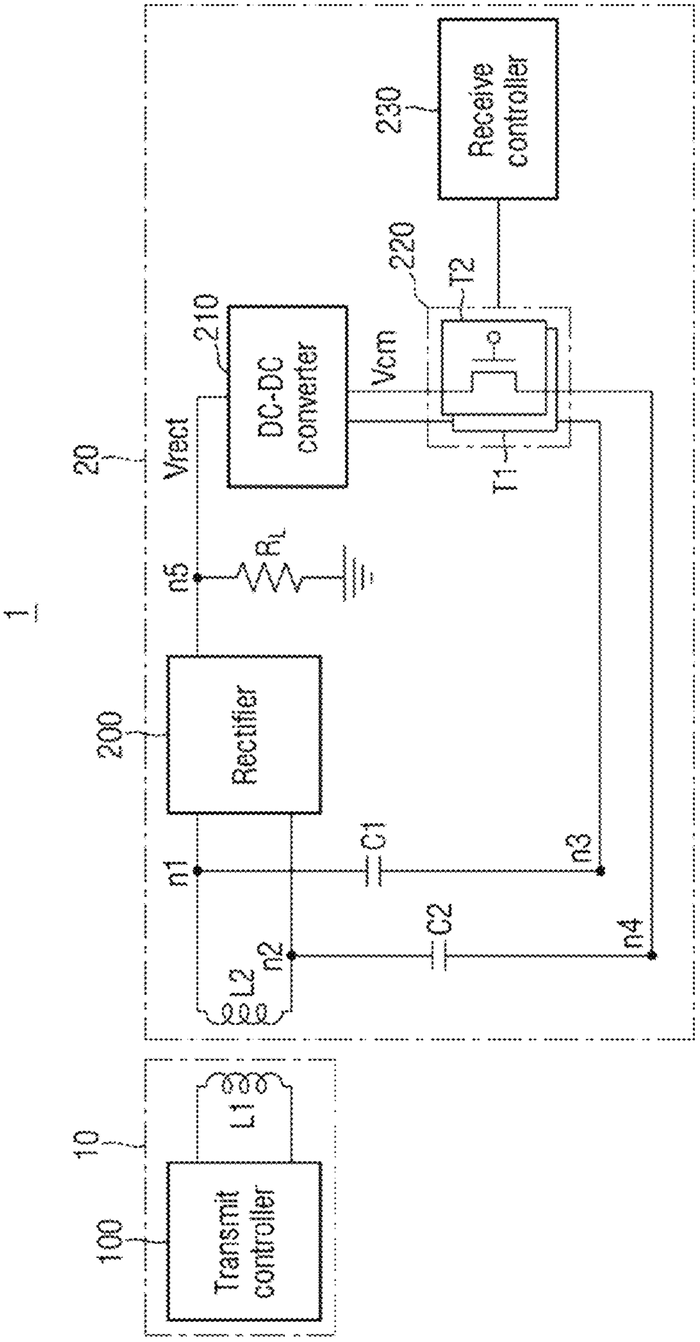

FIGS. 2 and 3 are example block diagrams specifically illustrating the inside of a wireless charging system according to some example embodiments.

Referring to FIG. 2, a wireless charging transmitter 10 and a wireless charging receiver 20 of a wireless charging system 1 according to some example embodiments may be shown as a series-series compensation (SS) equivalent circuit of a loosely coupled transformer. In some example embodiments, implementation of the wireless charging transmitter 10 and the wireless charging receiver 20 may be a parallel-parallel compensation (PP) equivalent circuit, a series-parallel compensation (SP) equivalent circuit, or a parallel-series compensation (PS) equivalent circuit, but the detailed implementation is not limited thereto. Only SS compensation is used for description in the present inventive concepts.

The wireless charging receiver 20 provided in some example embodiments of the present inventive concepts may further use magnetic resonance wireless charging techniques, near field communication (NFC) wireless charging techniques, or microwave wireless charging techniques in addition to electromagnetic induction wireless charging techniques. The techniques used in detail are not limited herein. In the present inventive concepts, only electromagnetic induction wireless charging techniques are used for description.

A data communication mode between the wireless charging transmitter 10 and the wireless charging receiver 20 may be wireless communication such as intraband (in-band) communication, Bluetooth communication, ZigBee communication, or Wi-Fi communication.

A transmit controller 100 for wireless charging may be, for example, a wireless charging transmission related module. The transmit controller 100 may include a direct current (DC) power source of the wireless charging transmitter 10, a DC/AC conversion module of the wireless charging transmitter 10, a serial matching capacitor of the wireless charging transmitter 10, and a control module of the wireless charging transmitter 10. The wireless charging transmitter 10 processes a direct current (DC) input to the wireless charging transmitter 10 by using a module related to the wireless charging transmitter 10 and an inductor L1 used as a transmission coil, and then transmits the direct current to a receiving coil of the wireless charging receiver 20 (e.g., inductor L2) by using the inductor L1 used as a transmission coil.

A process in which the wireless charging transmitter 10 processes the direct current by using the transmit controller 100 may include the following steps. The DC power source of the wireless charging transmitter 10 is configured to provide (e.g., generate, transmit, etc.) charging power (e.g., a charging power). As described herein, "power", "charging power", or the like may be referred to herein interchangeably as "electrical power," "charging electrical power," or the like. The DC/AC conversion module in the transmit controller 100 is connected to the DC power source of the wireless charging transmitter 10, receives the DC current output by the DC power source of the wireless charging transmitter 10, and converts the received direct current to an alternative current (AC) for output. The series matching capacitor in the transmit controller 100 is connected to the inductor L1 that is used as a transmission coil to form an oscillation circuit. The oscillation circuit is connected to the DC/AC conversion module of the wireless charging transmitter 10, receives the AC current output by the DC/AC conversion module of the wireless charging transmitter 10, and provides the AC current to the transmission coil. Through coupling of the inductor L1 used as the transmission coil and an inductor L2 used as a receiving coil of the wireless charging receiver 20, the power of the inductor L1 used as the transmission coil is forwarded (e.g., wirelessly transmitted) to the inductor L2 used as the receiving coil. The control module in the transmit controller 100 may be connected to a DC power source of the wireless charging transmitter 10, the DC/AC conversion module of the wireless charging transmitter 10, the serial matching capacitor of the wireless charging transmitter 10, and the inductor L1 used as the transmission coil, respectively, and is configured to exchange control parameters with each module to implement control for each module.

The wireless charging receiver 20 includes an inductor L2 serving as a receiving coil configured to receive (e.g., wirelessly receive) the power from the wireless charging transmitter 10 (e.g., wirelessly receive the electrical power, charging electrical power, or the like that is generated, transmitted, wirelessly transmitted, or the like by the wireless charging transmitter 10), a rectifier 200, a DC-DC converter 210, and a switching block 220.

The inductor L2 may be configured to be inductively coupled to the inductor L1 of the wireless charging transmitter 10. The inductor L2 may be configured to wirelessly receive electrical power (e.g., a charging power) from the inductor L1 of the wireless charging transmitter 10. The inductor L2 may be connected to series matching capacitors C1 and C2 of the wireless charging receiver 20 to form the oscillation circuit of the wireless charging receiver 20. For example, a first node n1, which is one end of the inductor L2, and the first capacitor C1 may be connected (e.g., directly connected or indirectly connected) to each other. Also, a second node n2, which is another one end of the inductor L2, and the second capacitor C2 may be connected (e.g., directly connected or indirectly connected) to each other.

The wireless charging receiver 20 according to some example embodiments may include various numbers (e.g., quantities) of capacitors, and capacitors connected in various connection schemes without being limited to the corresponding drawings.

For example, the wireless charging receiver 20 according to some example embodiments may include a capacitor connected only to the first node n1. In another example, the wireless charging receiver 20 according to some example embodiments may include two or more capacitors connected to the first node n1 between (e.g., directly between or indirectly between) the first node n1 and the switching block 220. Also, in another example, the wireless charging receiver 20 according to some example embodiments may include two or more capacitors connected to the second node n2 between (e.g., directly between or indirectly between) the second node n2 and the switching block 220.

In some example embodiments, the power received through the inductor L2 (e.g., power, charging power, electrical power, charging electrical power, or the like that is wirelessly received at the inductor L2 from the inductor L1 of the wireless charging transmitter 10) may be oscillated by the first capacitor C1 and the second capacitor C2 and converted into the AC (e.g., alternating current). Hereinafter, the power converted to the AC is collectively referred to as an AC signal. It may be thus understood that the wireless charging receiver 20 may be configured to generate the AC signal based on causing the power (e.g., charging power, electrical power, charging electrical power) that is wirelessly received at the inductor L2 from the wireless charging transmitter 10 to be oscillated and converted into AC.

The rectifier 200 is connected to the inductor L2. The rectifier 200 is configured to rectify a signal received from the inductor L2, where such a signal may include the AC signal generated based on the power received through the inductor L2 being oscillated by the first capacitor C1 and the second capacitor C2 and converted into the AC signal. In some example embodiments, the rectifier 200 receives the AC signal and rectifies the AC signal. The rectifier 200 generates an output voltage Vrect based on the received AC signal (e.g., based on rectifying the AC signal). The output voltage Vrect may be a stable output from which a change in voltage is removed.

The output voltage Vrect may be transmitted to the DC-DC converter 210. The DC-DC converter 210 may be a low drop out (LDO) that is a linear regulator, without being limited to the present example embodiments illustrated in the present drawings. Without limitation to the present example embodiments, the DC-DC converter 210 may be any other circuit that changes a power level from the output voltage Vrect to a common voltage Vcm.

The common voltage Vcm generated by the DC-DC converter 210 is not zero (0). For example, the common voltage Vcm may have a nonzero magnitude (e.g., may not have any null magnitude), which may be a positive or negative magnitude. For example, the common voltage Vcm generated by the DC-DC converter 210 (e.g., the magnitude of the common voltage Vcm) may be greater than zero (e.g., may have a nonzero positive magnitude), and may be smaller than a maximum value of the AC signal forwarded to the first node n1. For example, the magnitude of the common voltage Vcm may be smaller than a maximum magnitude and/or magnitude of an amplitude of the AC signal forwarded to the first node n1. In some example embodiments, for example, the common voltage Vcm generated by the DC-DC converter 210 may be greater than zero, and may be smaller than the maximum value of the AC signal forwarded to the second node n2. For example, the magnitude of the common voltage Vcm may be smaller than a maximum magnitude and/or magnitude of an amplitude of the AC signal forwarded to the second node n2.

The common voltage Vcm generated by the DC-DC converter 210 is forwarded to the switching block 220. The switching block 220 includes a plurality of switches SW1 and SW2 (e.g., first switch SW1 and second switch SW2). The number (e.g., quantity) of switches SW1 and SW2 included in the switching block 220 is not limited to the present example embodiments illustrated in the present drawings, and may be changed depending on the number of capacitors connected to the inductor L2. For example, in some example embodiments, the switching block 220 may include a single (first) switch SW1.

The first switch SW1 of the switching block 220 may be connected to the first capacitor C1 at a third node n3. In addition, the second switch SW2 of the switching block 220 may be connected to the second capacitor C2 at a fourth node n4. In some example embodiments, the first and second switches SW1 and SW2 of the switching block 220 may be connected in parallel to separate, respective capacitors C1 and C2 via separate, respective nodes n3 and n4.

Each of the switches SW1 and SW2 may receive the common voltage Vcm and may forward the common voltage Vcm to the capacitors C1 and C2. For example, the first switch SW1 may forward the common voltage Vcm to the first capacitor C1 through the third node n3 while the first switch SW1 is being closed (e.g., concurrently with the first switch SW1 being closed, turned on, etc.). In another example, the second switch SW2 may forward the common voltage Vcm to the second capacitor C2 through the fourth node n4 while the second switch SW2 is being closed (e.g., concurrently with the second switch SW2 being closed, turned on, etc.).

The operation in which each of the switches SW1 and SW2 is closed (turned on) may be controlled through a receive controller 230 for wireless charging.

The one or more switches included in the switching block 220 of the wireless charging receiver 20 according to some example embodiments may include one or a plurality of transistors T1 and T2 as shown in FIG. 3. For example, the first and second switches SW1 and SW2 shown in FIG. 2 may each include a separate one or more transistors.

For example, the first switch SW1 may include a first transistor T1, and the second switch SW2 may include a second transistor T2.

The description through FIG. 3 may be applied to FIG. 2, and thus will continue to be made with reference to FIG. 2.

Subsequently, referring to FIGS. 2 and 3, the wireless charging receiver 20 according to some example embodiments may generate the power (or AC signal) forwarded through the wireless charging transmitter 10, and wirelessly received at the wireless charging receiver 20 via the inductor L2, as the output voltage Vrect that is rectified through the rectifier 200, and may perform charging by using the output voltage Vrect.

At this time, the wireless charging receiver 20 may determine (e.g., based on operation of the receive controller 230) whether the power generated inside the wireless charging receiver 20 (e.g., the magnitude of the generated power, such as a magnitude of the common voltage Vcm, the magnitude of the output voltage Vrect, the magnitude and/or amplitude of the AC signal, or the like) is insufficient or exceeds a threshold value (e.g., is less than, equal to, or greater than a threshold magnitude, which may be stored at the receive controller 230) due to a load resistor $R_L$ formed in the wireless charging receiver 20.

The wireless charging receiver 20 which determines that a proper charging power is not formed therein transmits power information therein to the wireless charging transmitter 10 (e.g., in response to such determination).

At this time, the wireless charging receiver 20 sends a signal, which includes power information, from the inductor L2 to the inductor L1 to transmit the power information to the wireless charging transmitter 10. The wireless charging receiver 20 may use amplitude shift keying (ASK) to forward the signal, which includes power information, to the wireless charging transmitter 10.

At this time, noise (e.g., collectively referred to as acoustic noise, audible noise, or singing noise, and hereinafter, referred to as audible noise) of an audible frequency band may be generated in the signal forwarded from the wireless charging receiver 20 to the wireless charging transmitter 10.

However, the noise of the audible frequency band may be removed, reduced, or minimized through the common voltage Vcm received via a switching block 220 connected to the capacitors C1 and C2 of the wireless charging receiver 20 according to some example embodiments.

That is, when the switches of the switching block 220 are turned on (e.g., closed), noise of the audible frequency band, which is included in the signal forwarded from the wireless charging receiver 20 to the wireless charging transmitter 10, may be removed, reduced, or minimized through the common voltage Vcm transmitted to the capacitors C1 and C2. As a result, the wireless charging receiver 20 may be configured to remove, reduce, or minimize noise of an audible frequency band (e.g., referred to as acoustic noise, audible noise, or singing noise), which may otherwise occur in a communication process between the wireless charging transmitter 10 and the wireless charging receiver 20, in the signal forwarded from the wireless charging receiver 20 to the wireless charging transmitter 10 through amplitude modulation (e.g., amplitude shift keying (ASK)) based on the wireless charging receiver 20 including the switching block 220 including at least the first switch SW1 (e.g., including at least the first and second switches SW1 and SW2) and/or the DC-DC converter 210 and/or the receive controller 230, for example based on the operation of such at least one switch to transmission of the common voltage Vcm to the capacitors C1 and C2 of the wireless charging receiver 20.

Hereinafter, a detailed operation of the wireless charging receiver 20 according to some example embodiments will be described with reference to a timing diagram of FIG. 4.

Figure 4:
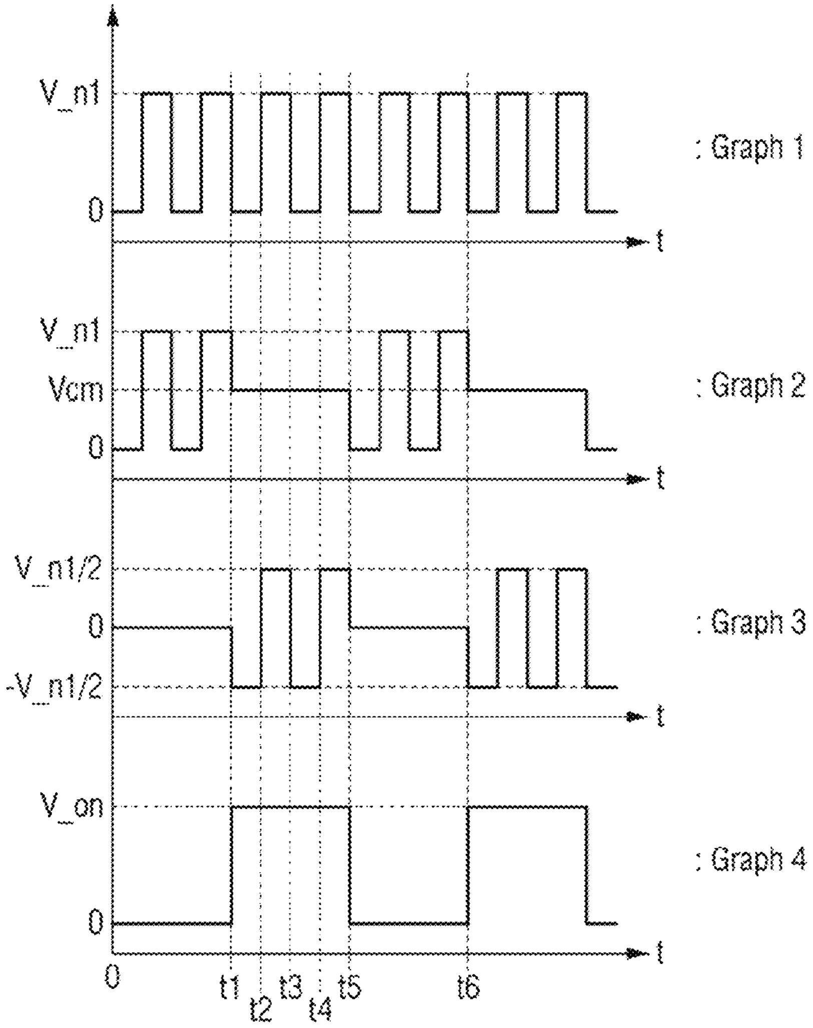
FIG. 4 is an example timing diagram illustrating an operation of a wireless charging receiver of a wireless charging system according to some example embodiments.

FIG. 4 is an example timing diagram illustrating an operation of a wireless charging receiver of a wireless charging system according to some example embodiments. It will be understood that the vertical axis in each of Graphs 1 to 4 shown in FIG. 4 is a magnitude (e.g., value) of voltage, and the horizontal axis in each of Graphs 1 to 4 shown in FIG. 4 is elapsed time during the operation of the wireless charging receiver.

Referring to FIGS. 2 to 4, the wireless charging receiver 20 according to some example embodiments may receive the AC signal of the first node n1 through the inductor L2. At this time, a maximum value of the AC signal forwarded to the first node n1 may be, for example, a first node maximum value V_n1. The AC signal forwarded to the first node n1 (e.g., the time-variation of the magnitude of the voltage of the AC signal) is represented through a first graph Graph 1.

At this time, a voltage may be formed (e.g., generated) at one end (e.g., the fourth node n4, or the third node n3) of the capacitors C1 and C2. For convenience of description, the voltage formed at the third node n3, which is one end of the first capacitor C1 connected to the first node n1 (e.g., an opposite end of the first capacitor C1 in relation to the end at which the first node n1 is located), will be described.

For reference, the description of the voltage formed at the third node n3, which is one end of the first capacitor C1 connected to the first node n1, may be applied to the description of the voltage formed at the fourth node n4, which is one end of the second capacitor C2 (e.g., an opposite end of the second capacitor C2 in relation to the end at which the second node n2 is located).

The voltage (e.g., magnitude of the voltage) formed at the third node n3, which is one end of the first capacitor C1, is represented through a second graph Graph 2.

In detail, a waveform of the third node n3 is the same as that of the AC signal of the first node n1, which is one end of the first capacitor C1. However, at a period where the switches SW1 and SW2 of the switching block 220 are closed (turned on), the voltage of the third node n3, which is one end of the first capacitor C1, has a potential of the common voltage Vcm, not the waveform of the AC signal of the first node n1.

For reference, a fourth graph Graph 4 is an operation voltage graph of the first switch SW1 of the switching block 220, but the fourth graph Graph 4 may be applied to the description of the operation of the second switch SW2 of the switching block 220. In the fourth graph Graph 4, the voltage (e.g., a magnitude of the voltage) for the operation in which the first switch SW1 is closed (turned on) is collectively referred to as an on voltage V_on.

For example, when the first switch SW1 of the switching block 220 is switched from being open (turned off) to being closed (turned on) at a first time period t1 and is subsequently switched from being closed to being open at a fifth time period t5, such that the first switch SW1 is closed starting at the first time period t1 and ending at the fifth time period t5, the third node n3, which is one end of the first capacitor C1, has the common voltage Vcm from the first time period t1 to the fifth time period t5.

Likewise, the voltage of the third node n3, which is one end of the first capacitor C1, has the common voltage Vcm from a sixth time period t6, at which the first switch SW1 of the switching block 220 is closed (turned on), for example where the first switch SW1 changes from being open to being closed at the sixth time period t6, to a time period at which the first switch SW1 is opened (turned off).

At this time, a voltage may be formed at both ends of the capacitors C1 and C2. For convenience of description, the voltage formed at both ends of the first capacitor C1 connected to the first node n1 will be described.

For reference, the description of the voltage formed at both ends (e.g., opposite ends) of the first capacitor C1 connected to the first node n1 may be applied to the description of the voltage formed at both ends (e.g., opposite ends) of the second capacitor C2 connected to the second node n2.

The voltage formed at both ends of the first capacitor C1 connected to the first node n1 (e.g., the voltage across the first capacitor C1 between the opposite ends of the first capacitor C1) is represented through a third graph Graph 3.

In detail, since there is no potential charged at both ends of the first capacitor C1 during a period at which the switches SW1 and SW2 of the switching block 220 are opened (turned off) (e.g., from the zero (0) time to the first time period t1), the voltage becomes 0 during such period.

For example, the voltage between the first node n1 and the third node n3, which are both ends of the first capacitor C1, becomes 0 until the first time period t1, where the first switch SW1 of the switching block 220 is opened (turned off) until the first time period t1, where the first switch SW1 of the switching block 220 is closed (turned on) at the first time period t1.

Likewise, the voltage between the first node n1 and the third node n3, which are both ends of the first capacitor C1, becomes 0 from the fifth time period t5, at which the first switch SW1 of the switching block 220 is opened (turned off), to the sixth time period t6 at which the first switch SW1 is closed (turned on).

At this time, the capacitors C1 and C2 of the wireless charging receiver 20 according to some example embodiments receive the common voltage Vcm from the switching block 220 for a certain time period (e.g., the first time period t1 to the fifth time period t5). As a result, the voltage applied to both ends of the capacitors C1 and C2 is shifted as much as the level of the common voltage Vcm, so that noise of the audible frequency band may be reduced or removed.

The third graph Graph 3 illustrates that the common voltage Vcm (e.g., the magnitude of the common voltage Vcm) is a half (one-half) of the first node maximum value V_n1 (e.g., the magnitude of the first node maximum value V_n1).

When the common voltage (e.g., the magnitude of the common voltage) of the wireless charging receiver 20 according to some example embodiments is greater than 0 and smaller than the half (e.g., smaller than one-half) of the first node maximum value V_n1, noise of the audible frequency band, which is included in the signal transmitted from the wireless charging receiver 20 to the wireless charging transmitter 10, may be weakened (e.g., reduced, minimized, or removed). Further, when the common voltage of the wireless charging receiver 20 according to some example embodiments is greater than the half of the first node maximum value V_n1 and smaller than the first node maximum value V_n1, noise of the audible frequency band, which is included in the signal transmitted from the wireless charging receiver 20 to the wireless charging transmitter 10, may be weakened.

In addition, when the common voltage of the wireless charging receiver 20 according to some example embodiments is the half of the first node maximum value V_n1, noise of the audible frequency band, which is included in the signal transmitted from the wireless charging receiver 20 to the wireless charging transmitter 10, may be removed, reduced, or minimized.

Referring to the third graph Graph 3, it can be seen that the voltage applied to both ends of the first capacitor C1 vibrates (e.g., oscillates between −V_n1/2 to V_n1/2) based on zero (0) potential from the first time period t1 to the fifth time period t5, at which the first switch SW1 is closed (turned on).

That is, both ends of the first capacitor C1 form a symmetrical waveform having a half of the first node maximum value V_n1 as a maximum value and the other half of the first node maximum value V_n1 as a minimum value based on zero (0) potential from the first time period t1 to the fifth time period t5.

As a result, the noise of the audible frequency band, which is included in the signal formed at both ends of the first capacitor C1, may be reduced, minimized, or removed from the first time period t1 to the fifth time period t5, at which (e.g., during which) the first switch SW1 is closed (turned on).

That is, the voltage applied between the first node n1 and the third node n3 is reduced to the half −V_n1/2 of the first node maximum value V_n1 at the first time period t1 and then is increased to the half of the first node maximum value V_n1 at the second time period t2, and is reduced to the half −V_n1/2 of the first node maximum value V_n1 at the third time period t3 and again increased to the half of the first node maximum value V_n1 at the third time period t4.

The effect of reducing or removing, reducing, or minimizing the noise of the audible frequency band through the common voltage Vcm formed inside the wireless charging receiver 20 according to some example embodiments will be described with reference to a graph of FIG. 5.

Figure 5:
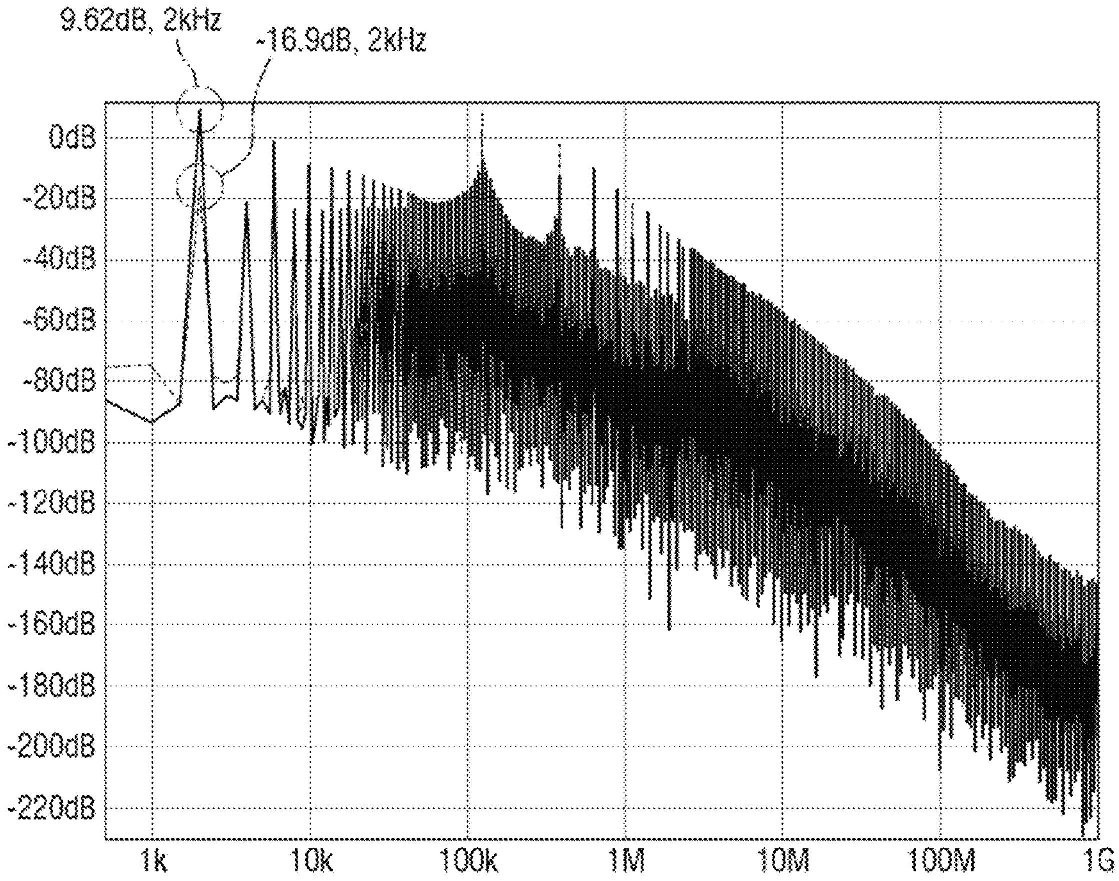
FIG. 5 is an example graph illustrating the effect of removing, reducing, or minimizing noise of an audible frequency band according to an operation of the wireless charging receiver according to some example embodiments.

FIG. 5 is an example graph illustrating the effect of removing, reducing, or minimizing noise of an audible frequency band according to an operation of the wireless charging receiver according to some example embodiments.

Referring to FIGS. 2 to 5, the graph of FIG. 5 is a graph of Fast Fourier Transform (FFT) performed for a signal between the first node n1 and the third node n3, which are both ends of the first capacitor C1, among the capacitors C1 and C2 of the wireless charging receiver 20 according to some example embodiments.

In the graph of FIG. 5, a solid line is a Fourier transform result graph of the wireless charging receiver 20 in which the common voltage Vcm is not generated, and a dotted line is a graph of a Fourier transform result graph of the wireless charging receiver 20 according to some example embodiments.

Subsequently, referring to FIGS. 2 to 5, it is noted that the noise of the audible frequency band (e.g., 2 kHz band) included in the signal generated at both ends of the capacitors C1 and C2 is reduced to −16.9 dB through the common voltage Vcm forwarded to one end (e.g., the third node n3 and the fourth node n4) of the capacitors C1 and C2 of the wireless charging receiver 20 according to some example embodiments.

This is in contrast to the case that the noise of the audible frequency band (e.g., 2 kHz band), which is included in the signal generated by the wireless charging receiver 20 in which the common voltage Vcm is not generated, is 9.62 dB.

Figure 6:
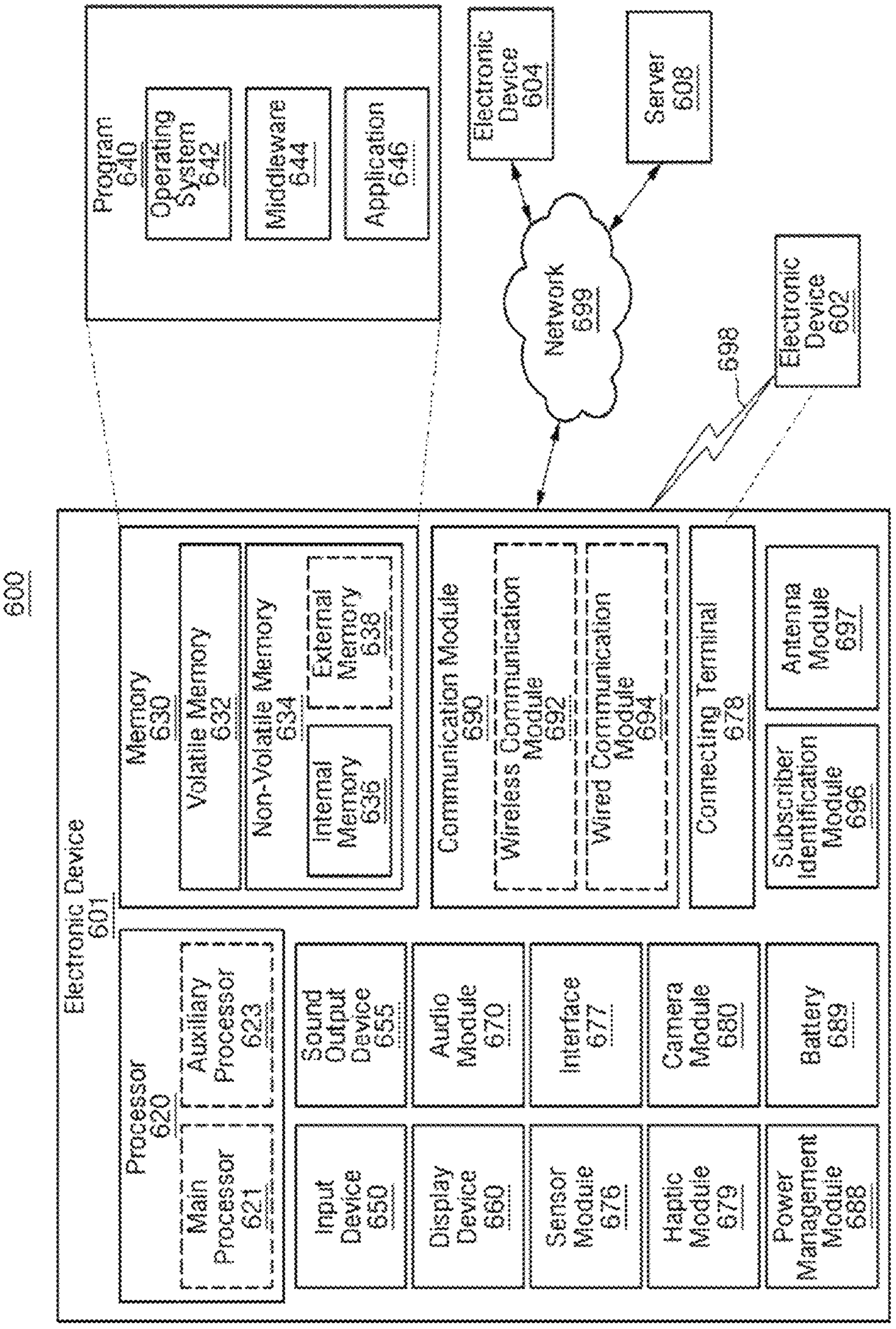
FIG. 6 is an example block diagram illustrating an electronic system to which a wireless charging system including the wireless charging receiver according to some example embodiments may be applied.

FIG. 6 is an example block diagram illustrating an electronic system to which a wireless charging system including the wireless charging receiver according to some example embodiments may be applied.

Referring to FIG. 6, in an electronic system 600 to which the wireless charging system described with reference to FIGS. 1 to 5 may be applied, an electronic device 601 may perform communication with an electronic device 602 via a first network 698 (e.g., short-range wireless communication network), or may perform communication with an electronic device 604 or a server 608 via a second network 699 (e.g., remote wireless communication network). According to some example embodiments, the electronic device 601 may communicate with the electronic device 604 via the server 608. According to some example embodiments, the electronic device 601 may include a processor 620, a memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module 696, or an antenna module 697. In some example embodiments, at least one (e.g., connecting terminal 678) of these components may be omitted, or one or more other components may be added to the electronic device 601. In some example embodiments, some (e.g., sensor module 676, camera module 680, or antenna module 697) of these components may be integrated into one component (e.g., display module 660).

The processor 620 may, for example, execute software (e.g., program 640) to control at least one other component (e.g., hardware or software component) of the electronic device 601 connected to the processor 620, and may perform a variety of data processing or computations. According to some example embodiments, as at least a portion of data processing or computation, the processor 620 may store commands or data received from other components (e.g., sensor module 676 or communication module 690) in a volatile memory 632, process the commands or data stored in the volatile memory 632 and store result data in a non-volatile memory 634. According to some example embodiments, the processor 620 may include a main processor 621 (e.g., a central processing unit or an application processor) or an auxiliary processor 623 (e.g., a graphics processing unit, a neural processing unit (NPU), an image signal processor, a sensor hub processor, or a communication processor) operable independently of or together with the main processor 621. For example, when the electronic device 601 includes the main processor 621 and the auxiliary processor 623, the auxiliary processor 623 may be configured to use a power lower than that of the main processor 621 or to be specialized for a specified function. The auxiliary processor 623 may be implemented separately from or as a portion of the main processor 621.

The auxiliary processor 623 may control, for example, at least some of functions or states related to at least one (e.g., the display module 660, the sensor module 676, or the communication module 690) of the components of the electronic device 601 on behalf of the main processor 621 while the main processor 621 is in an inactive (e.g., sleep) state or together with the main processor 621 while the main processor 621 is in an active (e.g., application execution) state. According to some example embodiments, the auxiliary processor 623 (e.g., an image signal processor or communication processor) may be implemented as a portion of a functionally related other component (e.g., camera module 680 or communication module 690). According to some example embodiments, the auxiliary processor 623 (e.g., a neural network processing unit) may include a hardware structure specialized for processing an artificial intelligence model. The artificial intelligence model may be generated through machine learning. Such learning may be performed, for example, in the electronic device 601 where artificial intelligence is performed, or may be performed via a separate server (e.g., server 608). Learning algorithms may include, but are not limited to, supervised learning, unsupervised learning, semi-supervised learning, or reinforcement learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more thereof, but is not limited thereto. The artificial intelligence model may additionally or in some example embodiments include a software structure in addition to the hardware structure.

The memory 630 may store various data used by at least one component (e.g., the processor 620 or the sensor module 676) of the electronic device 601. The data may include, for example, software (e.g., program 640) and input data or output data for commands related to the software. The memory 630 may include a volatile memory 632 or a non-volatile memory 634.

The program 640 may be stored as software in the memory 630, and may include, for example, an operating system 642, a middleware 644, or an application 646.

The input module 650 may receive commands or data to be used for the component (e.g., the processor 620) of the electronic device 601 from the outside (e.g., user) of the electronic device 601. The input module 650 may include, for example, a microphone, a mouse, a keyboard, a key (e.g., a button), or a digital pen (e.g., a stylus pen).

The sound output module 655 may output an acoustic signal to the outside of the electronic device 601. The sound output module 655 may include, for example, a speaker or a receiver. The speaker may be used for a general purpose of use such as multimedia reproduction or recording reproduction. The receiver may be used to receive an incoming call. According to some example embodiments, the receiver may be implemented separately from or as a portion of the speaker.

The display module 660 may visually provide information to the outside (e.g., user) of the electronic device 601. The display module 660 may include, for example, a display, a hologram device or a projector, and a control circuit for controlling the corresponding device. According to some example embodiments, the display module 660 may include a touch sensor configured to sense a touch, or a pressure sensor configured to measure intensity of a force generated by the touch.

The audio module 670 may convert sound into an electrical signal, or vice versa. According to some example embodiments, the audio module 670 may obtain sound via the input module 650, or may output sound via the sound output module 655 or an external electronic device (e.g., the electronic device 602) (e.g., a speaker or headphone) directly or wirelessly connected to the electronic device 601.

The sensor module 676 may sense an operating state (e.g., power or temperature) of the electronic device 601 or an external environment state (e.g., user state), and may generate an electrical signal or data value corresponding to the sensed state. According to some example embodiments, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more designated protocols that may be used to directly or wirelessly connect the electronic device 601 to the external electronic device (e.g., the electronic device 602). According to some example embodiments, the interface 677 may include, for example, a High Definition Multimedia Interface (HDMI), a Universal Serial Bus (USB) interface, an SD card interface, or an audio interface.

The connecting terminal 678 may include a connector through which the electronic device 601 may be physically connected to the external electronic device (e.g., the electronic device 602). According to some example embodiments, the connecting terminal 678 may include, for example, an HDMI connector, a USB connector, an SD card connector, or an audio connector (e.g., a headphone connector).

The haptic module 679 may convert an electrical signal into a mechanical stimulus (e.g., vibration or motion) or an electrical stimulus that a user may recognize through a tactile or motion sensation. According to some example embodiments, the haptic module 679 may include, for example, a motor, a piezoelectric element, or an electrical stimulation device.

The camera module 680 may photograph a still image and a moving picture. According to some example embodiments, the camera module 680 may include one or more lenses, image sensors, image signal processors, or flashes.

The power management module 688 may manage power supplied to the electronic device 601. According to some example embodiments, the power management module 688 may be implemented as at least a portion of a power management integrated circuit (PMIC), for example.

The battery 689 may supply a power to at least one component of the electronic device 601. According to some example embodiments, the battery 689 may include, for example, a non-rechargeable primary battery, a rechargeable secondary battery, or a fuel cell.

The communication module 690 may support establishment of a direct (e.g., wired) communication channel or wireless communication channel between the electronic device 601 and the external electronic device (e.g., the electronic device 602, the electronic device 604, or the server 608), and communication through the established communication channel. The communication module 690 may include one or more communication processors operating independently of the processor 620 (e.g., an application processor) and supporting direct (e.g., wired) communication or wireless communication. According to some example embodiments, the communication module 690 may include a wireless communication module 692 (e.g., a cellular communication module, a local area wireless communication module, or a global navigation satellite system (GNSS) communication module) or a wired communication module 694 (e.g., a local area network (LAN) communication module, or a power line communication module). A corresponding communication module of these communication modules may perform communication with an external electronic device 604 via the first network 698 (e.g., a short-range communication network such as Bluetooth, wireless fidelity (WiFi) direct or infrared data association (IrDA)) or the second network 699 (e.g., a long-range communication network such as a legacy cellular network, a 5G network, a next generation communication network, Internet, or a computer network (e.g., LAN or WAN)). These various types of communication modules may be integrated into one component (e.g., single chip), or may be implemented with a plurality of separate components (e.g., a plurality of chips). The wireless communication module 692 may identify or authenticate the electronic device 601 within a communication network, such as the first network 698 or the second network 699, by using subscriber information (e.g., International Mobile Subscriber Identifier (IMSI)) stored in the subscriber identification module 696.

The wireless communication module 692 may support 5G network subsequent to 4G network and next generation communication technology, e.g., new radio (NR) access technology. The NR access technology may support enhanced mobile broadband (eMBB) of high-capacity data, terminal power minimization, massive machine type communications (mMTC), or ultra-reliable and low-latency communications (URLLC). The wireless communication module 692 may support, for example, a high frequency band (e.g., mmWave band) to achieve a high data transmission rate.

The wireless communication module 692 may support various technologies for making sure of performance in a high frequency band, such as beamforming, massive multiple-input and multiple-output (MIMO), full dimensional MIMO (FD-MIMO), array antenna, analog beamforming, or large-scale antenna. The wireless communication module 692 may support various requirements defined in the electronic device 601, the external electronic device (e.g., the electronic device 604) or the network system (e.g., the second network 699). According to some example embodiments, the wireless communication module 692 may support a peak data rate (e.g., 20 Gbps or more) for realizing eMBB, loss coverage (e.g., 164 dB or less) for realizing mMTC, or U-plane latency (e.g., downlink (DL) and uplink (UL) of 0.5 ms or less, respectively, or round trip of 1 ms or less) for realizing URLLC.

The antenna module 697 may transmit or receive a signal or power to or from the outside (e.g., the external electronic device). According to some example embodiments, the antenna module 697 may include an antenna that includes a radiator formed of a conductor or conductive pattern formed on a substrate (e.g., PCB). According to some example embodiments, the antenna module 697 may include a plurality of antennas (e.g., array antennas). In such a case, at least one antenna suitable for a communication scheme used in the communication network, such as the first network 698 or the second network 699, may be selected from the plurality of antennas, for example, by the communication module 690. A signal or power may be transmitted or received between the communication module 690 and the external electronic device via the selected at least one antenna. According to some example embodiments, other component (e.g., a radio frequency integrated circuit (RFIC)) other than the radiator may be additionally formed as a portion of the antenna module 697.

According to some example embodiments, the antenna module 697 may form an mmWave antenna module. According to some example embodiments, the mmWave antenna module may include a printed circuit board, an RFIC disposed on or to be adjacent to a first surface (e.g., a lower surface) of the printed circuit board, capable of supporting a designated high frequency band (e.g., mmWave band), and a plurality of antennas (e.g., array antennas) disposed on or to be adjacent to a second surface (e.g., upper surface or side) of the printed circuit board, capable of transmitting or receiving a signal of the designated high frequency band.

At least a portion of the above components may be connected to each other through a communication method (e.g., bus, general purpose input and output (GPIO), serial peripheral interface (SPI), or mobile industry processor interface (MIPI)) between peripheral devices and may exchange signals (e.g., commands or data) with each other.

According to some example embodiments, the command or data may be transmitted or received between the electronic device 601 and the external electronic device 604 via the server 608 connected to the second network 699. The external electronic devices 602 and 604 may be the same or different kinds of devices as or from the electronic device 601. According to some example embodiments, all or some of the operations executed in the electronic device 601 may be executed in one or more of the external electronic devices 602, 604 and 608. For example, when the electronic device 601 needs to perform functions or services automatically or in response to a request from a user or another device, the electronic device 601 may request one or more external electronic devices to perform at least a portion of the functions or services instead of executing the functions or services by themselves. The one or more external electronic devices that have received the request may execute at least a portion of the requested functions or services, or an additional function or service associated with the request, and may forward the result of the execution to the electronic device 601.

The electronic device 601 may process the results as it is or additionally and provide the result as at least a portion of the response to the request. To this end, for example, cloud computing, distributed computing, mobile edge computing (MEC), or client-server computing technology may be used. The electronic device 601 may provide ultra-low latency services by using, for example, distributed computing or mobile edge computing. In some example embodiments, the external electronic device 604 may include an Internet of Things (IoT) device. The server 608 may be an intelligent server based on machine learning and/or neural networks. According to some example embodiments, the external electronic device 604 or the server 608 may be included in the second network 699. The electronic device 601 may be applied to intelligent services (e.g., smart home, smart city, smart car, or health care) based on 5G communication technology and IoT-related technology.

The electronic devices according to some example embodiments disclosed herein may be various types of devices. The electronic device may include, for example, a portable communication device (e.g., smartphone), a computer device, a portable multimedia device, a portable medical device, a camera, a wearable device, or a home appliance. The electronic devices according to the example embodiments of the present inventive concepts are not limited to the above-described devices.

As described herein, any devices, systems, modules, units, blocks, controllers, circuits, terms such as receiver or transmitter (~or, ~er), which are used in the detailed description, functional blocks shown in the drawings, and/or any portions thereof according to any of the example embodiments (including, without limitation, the wireless charging system 1, the wireless charging transmitter 10, the wireless charging receiver 20, the transmit controller 100, the rectifier 200, the DC-DC converter 210, the switching block 220, the receive controller 230, the electronic system 600, the electronic device 601, the electronic device 602, the electronic device 604, the server 608, the second network 699, the processor 620, the main processor 621, the auxiliary processor 623, the memory 630, the volatile memory 632, the non-volatile memory 634, the internal memory 636, the external memory 638, the program 640, the operating system 642, the middleware 644, the application 646, the input module 650, the sound output module 655, the display module 660, the audio module 670, the sensor module 676, the interface 677, the connecting terminal 678, the haptic module 679, the camera module 680, the power management module 688, the battery 689, the communication module 690, the wireless communication module 692, the wired communication module 694, the subscriber identification module 696, the antenna module 697, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, units, blocks, controllers, circuits, terms such as receiver or transmitter (~or, ~er), which are used in the detailed description, functional blocks shown in the drawings, and/or any portions thereof according to any of the example embodiments, and/or any portions thereof, including any of the methods according to any of the example embodiments.

Some example embodiments of the present document may be implemented as software (e.g., program 640) including one or more commands stored in a storage medium (e.g., internal memory 636 or external memory 638) readable by a machine (e.g., electronic device 601). For example, a processor (e.g., processor 620) of the machine (e.g., electronic device 601) may call at least one of the one or more commands from the storage medium and execute it. This enables the machine to be operated to perform at least one function in accordance with the at least one command that is called. The one or more commands may include codes generated by a compiler or codes that may be executed by an interpreter. The machine-readable storage medium may be provided in the form of a non-transitory storage medium. In some example embodiments, the term 'non-transitory' means that the storage medium is tangible and does not include a signal (e.g., electromagnetic wave). The term 'non-transitory' does not distinguish the case that the data are stored semi-permanently in the storage medium from the case that the data are temporarily stored in the storage medium.

According to some example embodiments, a method according to some example embodiments disclosed herein may be provided by being included in a computer program product. The computer program product may be transacted between a seller and a buyer as a product. The computer program product may be distributed in the form of a machine-readable storage medium (e.g., compact disc read only memory (CD-ROM)), or may be distributed online (e.g., downloaded or uploaded) via an application store (e.g., play Store™) or directly between two user devices (e.g., smart phones). In case of online distribution, at least a portion of the computer program product may be at least temporarily stored or temporarily generated in the machine-readable storage medium, such as a server of a manufacturer, a server of an application store, or a memory of a relay server.

Although some example embodiments of the present inventive concepts have been described above with reference to the accompanying drawings, it will be understood by those of ordinary skill in the art that the present inventive concepts are not limited thereto and may be implemented in many different forms without departing from the technical idea or essential features thereof. Therefore, it should be understood that the embodiments set forth herein are merely examples in all respects and not restrictive.

What is claimed is:

1. A wireless charging receiver configured to wirelessly receive electrical power from a wireless charging transmitter, the wireless charging receiver comprising:

an inductor configured to be inductively coupled to the wireless charging transmitter, a rectifier connected to the inductor, the rectifier configured to rectify a signal received from the inductor;

a DC-DC converter configured to convert a DC signal received from the rectifier;

a switching block configured to receive a common voltage generated by the DC-DC converter, wherein the switching block includes a first switch;

a first capacitor configured to receive the common voltage from the switching block at a first terminal of the first capacitor, wherein a second terminal of the first capacitor is connected to the inductor at a first node, and wherein the common voltage is not zero; and a receive controller configured to operate the first switch to switch a voltage at the first terminal of the first capacitor between a voltage at the first node and the common voltage.

2. The wireless charging receiver of claim 1, further comprising:

a second capacitor connected to the inductor, the second capacitor further connected to a second node that is different from the first node, wherein the switching block further includes a second switch, wherein the second capacitor is connected to the second switch, and wherein the second switch is configured to forward the common voltage to the second capacitor.

3. The wireless charging receiver of claim 1, wherein the receive controller is configured to control the switching block.

4. The wireless charging receiver of claim 3, wherein the receive controller is configured to control the common voltage to be forwarded to the first capacitor from a first time period to a second time period as the first switch is closed from the first time period to the second time period.

5. The wireless charging receiver of claim 1, wherein a signal received in the first node is a first AC signal, and a magnitude of the common voltage is one-half of a maximum value of the first AC signal.

6. The wireless charging receiver of claim 2, wherein
a signal received in the first node is a first AC signal, and a magnitude of the common voltage is one-half of a maximum value of the first AC signal
a second AC signal is received in the second node that is different from the first node, and
the second AC signal has a same amplitude as the first AC signal.

7. The wireless charging receiver of claim 1, wherein the first switch is a transistor.

8. A wireless charging system comprising a wireless charging receiver configured to
wirelessly receive electrical power from a wireless charging transmitter,
modulate an amplitude of an AC signal received through a first capacitor based on the wirelessly received electrical power, and
transmit the AC signal, of which amplitude is modulated, to the wireless charging transmitter,
wherein the first capacitor is configured to
receive the AC signal through a first node,
receive, from a DC-DC converter, a common voltage, which is not 0, through a second node that is different from the first node, and
remove noise of an audible frequency band that is included in the AC signal of which amplitude is modulated.

9. The wireless charging system of claim 8, wherein a magnitude of the common voltage is one-half of a maximum value of the AC signal.

10. The wireless charging system of claim 8, further comprising a switching block, the switching block including a first switch that is configured to transmit the common voltage to the first capacitor.

11. The wireless charging system of claim 10, wherein the first switch is a transistor.

12. The wireless charging system of claim 8, wherein the common voltage is generated based on converting a DC signal formed by rectifying the AC signal.

13. The wireless charging system of claim 8, wherein the common voltage is applied from a first time period to a second time period.

14. The wireless charging system of claim 8, further comprising a second capacitor that is configured to receive the AC signal, the second capacitor connected to the common voltage.

15. A wireless charging system, comprising:
a wireless charging transmitter configured to generate charging electrical power; and
a wireless charging receiver configured to wirelessly receive the charging electrical power from the wireless charging transmitter,
wherein the wireless charging receiver includes
an inductor inductively coupled to the wireless charging transmitter,
a rectifier connected to the inductor, the rectifier configured to rectify a signal received from the inductor,
a DC-DC converter configured to convert a DC signal received from the rectifier,
a switching block configured to receive a common voltage generated by the DC-DC converter, wherein the switching block includes a first switch,
a first capacitor configured to receive the common voltage from the switching block at a first terminal of the first capacitor, wherein a second terminal of the first capacitor is connected to the inductor at a first node, and wherein the common voltage is not zero; and
a receive controller configured to operate the first switch to switch a voltage at the first terminal of the first capacitor between a voltage at the first node and the common voltage.

16. The wireless charging system of claim 15, further comprising:
a second capacitor connected to the inductor at a second node that is different from the first node,
wherein the switching block further includes a second switch,
wherein the second capacitor is connected to the second switch, and
wherein the second switch is configured to forward the common voltage to the second capacitor.

17. The wireless charging system of claim 15, wherein the receive controller is configured to control the switching block.

18. The wireless charging system of claim 17, wherein the receive controller is configured to control the common voltage to be forwarded to the first capacitor from a first time period to a second time period as the first switch is closed from the first time period to the second time period.

19. The wireless charging system of claim 15, wherein a signal received in the first node is a first AC signal, and a magnitude of the common voltage is one-half of a maximum value of the first AC signal.

20. The wireless charging system of claim 15, wherein the first switch is a transistor.

* * * * *